United States Patent
Kobayashi et al.

(10) Patent No.: US 8,617,749 B2
(45) Date of Patent: Dec. 31, 2013

(54) NON-AQUEOUS ELECTROLYTE AND LITHIUM SECONDARY BATTERY USING THE SAME

(75) Inventors: Toshiyuki Kobayashi, Tokai (JP); Kazushige Kohno, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 271 days.

(21) Appl. No.: 13/029,853

(22) Filed: Feb. 17, 2011

(65) Prior Publication Data

US 2011/0223476 A1    Sep. 15, 2011

(30) Foreign Application Priority Data

Mar. 11, 2010 (JP) ................... 2010-054354

(51) Int. Cl.
*H01M 6/16* (2006.01)

(52) U.S. Cl.
USPC ........... 429/326; 429/322; 429/323; 429/324; 429/327; 429/304; 429/306; 429/309; 429/330; 429/332

(58) Field of Classification Search
USPC ......... 429/304, 306, 309, 322–324, 326, 327, 429/330, 332
See application file for complete search history.

(56) References Cited

U.S. PATENT DOCUMENTS

| | | | |
|---|---|---|---|
| 2004/0139587 A1* | 7/2004 | Sato et al. | 29/25.03 |
| 2006/0172201 A1* | 8/2006 | Yasukawa et al. | 429/329 |
| 2007/0224514 A1* | 9/2007 | Kotato et al. | 429/325 |
| 2008/0131772 A1 | 6/2008 | Jambunathan et al. | |
| 2010/0047695 A1* | 2/2010 | Smart et al. | 429/307 |
| 2010/0119956 A1* | 5/2010 | Tokuda et al. | 429/338 |
| 2011/0008681 A1 | 1/2011 | Koh et al. | |
| 2011/0045361 A1* | 2/2011 | Abe et al. | 429/343 |

FOREIGN PATENT DOCUMENTS

| | | | |
|---|---|---|---|
| EP | 2 144 321 A1 | 1/2010 | |
| JP | 2003173819 | 6/2003 | |
| JP | 2006-202745 | 8/2006 | |
| JP | 2007-115583 | 5/2007 | |
| JP | 2007115583 | 5/2007 | |
| JP | 2007258067 | 10/2007 | |
| WO | WO 2008/126800 | * 10/2008 | H01M 4/58 |
| WO | WO 2009/035085 | 3/2009 | |
| WO | WO 2009/122908 | 10/2009 | |

OTHER PUBLICATIONS

JP Office Action of Appln. No. 2010-054354 dated Jun. 12, 2012.
Canadian Office Action of Appln. No. 2,732,700 dated Jul. 18, 2012 in English.
EP Search Report of Appln. No. 11155889.6 dated Dec. 29, 2011 in English.
Communication mailed Apr. 11, 2013, in connection with Chinese Patent Application No. 201110041236.6, 6 pages; Chinese Patent Office, Republic of China.
Korean office action of Appln. No. 2011-14292 dated Jan. 30, 2013 with partial translation.

* cited by examiner

*Primary Examiner* — Milton I Cano
*Assistant Examiner* — Jeremiah Smith
(74) *Attorney, Agent, or Firm* — Antonelli, Terry, Stout & Kraus, LLP.

(57) ABSTRACT

A non-aqueous electrolyte and a lithium secondary battery using the same are provided, which satisfy both flame retardancy and charge-discharge cycle characteristics, and attain a longer lifetime of the battery. A mixture of a chain carbonate, vinylene carbonate, a fluorinated cyclic carbonate and a phosphate ester is used as the non-aqueous electrolyte. It is desirable that the phosphate ester includes trimethyl phosphate and a fluorinated phosphate ester. Further, it is desirable that ethylene carbonate is further contained.

5 Claims, 2 Drawing Sheets

NON-AQUEOUS ELECTROLYTE AND LITHIUM SECONDARY BATTERY USING THE SAME

BACKGROUND OF THE INVENTION

The present invention relates to a non-aqueous electrolyte and a lithium secondary battery using the same.

In recent years, requirement for compact-sizing or higher energy density has been increasing, as for a power source for mobile communication such as mobile phones, or mobile personal computers. In addition, development has also been progressing of storage power sources of midnight power, or power sources for power storage in combination of solar batteries or wind-power generation. Commercial application has also been progressing of electric cars, hybrid vehicles utilizing electric power as a part of motive power, and hybrid trains.

As the non-aqueous electrolyte, one in which an electrolyte such as lithium hexafluorophosphate is dissolved in a non-aqueous solvent such as ethylene carbonate has widely been known. These non-aqueous solvent are generally easy to volatile, and have inflammability.

In particular, for application of relatively large-size lithium secondary batteries such as the power source for power storage, use of the non-aqueous electrolyte without fear of flashing has been desired. Accordingly, research on furnishing flame retardancy to the non-aqueous electrolyte by blending a flame retardant agent has been promoted energetically.

JP-A-2003-173819 has disclosed the non-aqueous electrolyte having a composition limited to a phosphate ester and a cyclic carboxylate ester/a carbonate ester.

JP-A-2007-115583 has disclosed an electrolyte and a battery, which contains a halogenated carbonate ester and a phosphorous-containing compound to enhance chemical stability at high temperatures.

JP-A-2007-258067 has disclosed a non-aqueous electrolyte battery in which a phosphate ester having a fluorine atom in its molecular chain was added and the additive amount or the like was specified.

SUMMARY OF THE INVENTION

However, in the case of adding the flame retardant agent to the non-aqueous electrolyte, there was a room for improvement in that the increased additive amount to acquire sufficient flame retardancy decreases an initial capacity and decreases charge-discharge cycle characteristics.

It is an object of the present invention to provide a non-aqueous electrolyte and a lithium secondary battery using the same, which satisfy both the flame retardancy and the charge-discharge cycle characteristics, and attain a longer lifetime of the battery.

The non-aqueous electrolyte of the present invention is a mixture containing a chain carbonate, vinylene carbonate, a fluorinated cyclic carbonate and a phosphate ester.

According to the present invention, it is possible to satisfy both the flame retardancy and the charge-discharge cycle characteristics, and attain the longer lifetime of the battery.

Other objects, features and advantages of the invention will become apparent from the following description of the embodiments of the invention taken in conjunction with the accompanying drawings.

DETAILED DESCRIPTION OF THE EMBODIMENTS

Figure 1:
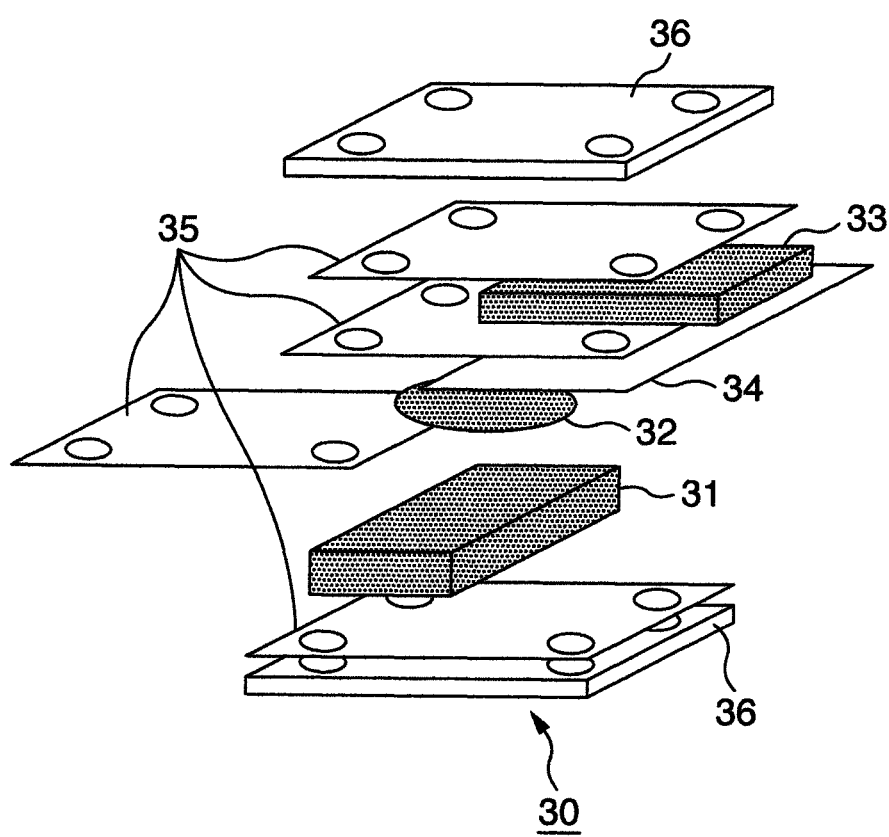
FIG. 1 is a schematic exploded view of a test cell used in a charge-discharge test.

Explanation will be given below on the non-aqueous electrolyte and the lithium secondary battery using the same, relevant to one embodiment of the present invention.

The non-aqueous electrolyte contains a chain carbonate, vinylene carbonate, a fluorinated cyclic carbonate and a phosphate ester.

In the non-aqueous electrolyte, the phosphate ester is at least one kind of compound selected from a group composed of trimethyl phosphate and a fluorinated phosphate ester.

The additive amount of the phosphate ester is desirably 1 to 15% by weight, and further desirably 1 to 9% by weight.

The additive amount of the fluorinated phosphate ester is desirably 0.5 to 6% by weight, and further desirably 0.5 to 4% by weight.

The lithium secondary battery uses the non-aqueous electrolyte.

Further, in the non-aqueous electrolyte, the following components can be used.

The chain carbonate includes a non-symmetrical chain carbonate such as methyl ethyl carbonate, methyl propyl carbonate, methyl butyl carbonate and ethyl propyl carbonate; a symmetrical chain carbonate such as dimethyl carbonate, diethyl carbonate, dipropyl carbonate and dibutyl carbonate.

As the phosphate ester, trimethyl phosphate, triethyl phosphate, tributyl phosphate, triphenyl phosphate, tricresyl phosphate, and trixylenyl phosphate or the like may be used.

As the fluorinated phosphate ester, besides tris(2,2,2-trifluoroethyl) phosphate, tris(2,2,3,3-tetrafluoropropyl) phosphate, tris(2,2,3,3,4,4,5,5-octafluoropentyl) phosphate and the like may be used.

As the non-aqueous electrolyte (hereinafter, referred to simply as an electrolyte), for example, there can be preferably used a simple substance or a mixture of ethylene carbonate, propylene carbonate, butylene carbonate, dimethyl carbonate, diethyl carbonate, ethyl methyl carbonate, γ-butyrolactone, γ-valerolactone, tetrahydrofuran, 2-methyltetrahydrofuran, 1,2-dimethoxyethane, dimethylsulfoxide, and sulfolane.

As the non-aqueous electrolyte, vinylene carbonate and fluorinated cyclic carbonate may be used. By using these, it is presumed that a stable coating film is formed on the surface of an electrode.

A content of the vinylene carbonate in the electrolyte is preferably in a range 0.5 to 5% by weight. In the case where the content of the vinylene carbonate is below 0.5% by weight, the enhancement effect of the cyclic characteristics decreases, while in the case where the content of the vinylene carbonate is over 5% by weight, a charge-discharge efficiency decreases by excess decomposition of the vinylene carbonate.

A content of the fluorinated cyclic carbonate in the electrolyte is preferably in a range 0.5 to 15% by weight. In the case where the content of the fluorinated cyclic carbonate is below 0.5% by weight, the enhancement effect of the cyclic characteristics decreases, while in the case where the content of the fluorinated cyclic carbonate is over 15% by weight, the charge-discharge efficiency decreases by excess decomposition of the fluorinated cyclic carbonate.

As the fluorinated cyclic carbonate, for example, fluoroethylene carbonate is included.

As a supporting electrolyte used in the electrolyte, a simple substance or a mixture of such as, for example, $LiPF_6$, $LiBF_4$, $LiClO_4$, $LiAsF_6$, $LiSbF_6$, $LiCF_3SO_3$ and $LiN(SO_2CF_3)_2$ can preferably be used. Concentrations of these supporting electrolytes are not especially limited, however, they are preferable to be in a range 0.8 to 2.0 mol/l (mole/liter). Among these supporting electrolytes, $LiPF_6$ or $LiBF_4$ is desirable, and $LiPF_6$ is particularly desirable.

Into the electrolyte, at least one kind of a salt selected from a group consisting of a bis(oxalato)borate, difluoro(oxalato)borate, tris(oxalato)phosphate, difluoro(bisoxalato)phosphate, and tetrafluoro (bisoxalato)phosphate may be added. The addition of these salts is considered to lead to enhancement of battery performance by forming a coated film on the electrode.

Other additives generally used may be added in an arbitrary ratio, as long as they do not impair the gist of the present invention. Specifically, a compound having an overcharging prevention effect, or a positive-electrode protection effect such as cyclohexylbenzene, biphenyl, t-butylbenzene, and propanesultone, is included.

Explanation will be given next on a composition of the lithium secondary battery.

In the lithium secondary battery, the non-aqueous electrolyte is used. As other composition members, a negative electrode, a positive electrode, a collector, a separator, and a container and the like, which are used in a general lithium secondary battery, may be used.

A material of the negative electrode composing the battery is not especially limited, as long as it is a material being capable of occluding and releasing lithium as negative electrode material. For example, there is included artificial graphite, natural graphite, non-graphitizable carbons, a metal oxide, a metal nitride, activated carbon, or the like. In addition, they may be used alone or in combination of two or more kinds by mixing them.

A material of the positive electrode composing the battery is not especially limited, as long as it is a material being capable of occluding and releasing lithium, like a lithium-transition metal complex oxide such as lithium manganese oxide, lithium cobalt oxide or lithium nickel oxide, and the like. The lithium-transition metal complex oxide is a particularly preferable material.

As the negative electrode and the positive electrode, one made, for example, by adding and mixing a binding agent, a thickener, an electric conducting material, a solvent or the like, as occasion demands, coating it on a substrate of the collector, drying, and then cutting out into a desirable shape, can be used.

As the separator composing the battery, a porous sheet or non-woven fabric using polyolefin such as polyethylene or polypropylene as a raw material can be used.

Using the above composition elements, the lithium secondary battery having a shape of a coin, cylindrical, rectangular, an aluminum lamination sheet or the like can be assembled.

Explanation will be given below further specifically with reference to Examples of the present invention, however, the present invention should not be limited to these Examples.

EXAMPLE 1

Into a mixed solution (volume ratio=0.9:0.1:2) of ethylene carbonate (EC), fluoroethylene carbonate (FEC) and ethyl methyl carbonate (EMC), 0.8% by weight of vinylene carbonate (VC) and 1 mol/l of $LiPF_6$ were dissolved. Into this, trimethyl phosphate (TMP) was added so as to be 5% by weight, to prepare an electrolyte.

On this electrolyte, the following firing test was carried out to evaluate flame retardancy.

(A Firing Test)

2 ml of each of various electrolytes was impregnated into a glass fiber (20 mm width×65 mm length), and exposed to a test flame for 10 seconds in the air, and after that, the test flame was removed, and a state of flashing flame was observed visually, and a time till the flame died out was measured. The case where the extinguishing time is below 10 seconds was ranked as flame retardant, and the case of 10 seconds or over was ranked flammable.

In addition, a test cell was prepared using the above electrolyte and graphite as the negative electrode material, to carry out a charge-discharge test.

(Evaluation of the Negative Electrode for the Lithium Secondary Battery)

Natural graphite was used as the negative electrode active material, and polyvinylidene fluoride was used as the binder.

Firstly, a solution was prepared, where the binder was dissolved in a ratio of 5% by weight into N-methyl-2-pyrrolidone. Next, into this solution, natural graphite was added and kneaded so as to be a ratio of 8.6% by weight, and by further adding N-methyl-2-pyrrolidone, a negative electrode mixture slurry was prepared.

This negative electrode mixture slurry was coated on one surface of a copper foil, which is the collector, and dried.

After that, the negative electrode for the lithium secondary battery was prepared by compression molding with a roll press machine, and cutting into a predetermined size.

A test cell was prepared using this negative electrode for lithium secondary battery.

FIG. 1 is a schematic exploded view of a test cell used in measurement.

In this drawing, a counter electrode 31, a test electrode 32 (negative electrode) and a reference electrode 33 are laminated in an insulated state, by sandwiching a separator 35 between each of them, and pressed at the outer side with a tool 36 made of SUS.

In this drawing, the test electrode 32 and a collector 34 made of the copper foil are illustrated separately, however, they are prepared as an integrated member, as described above. In addition, the test electrode 32 is drawn disk-like with a diameter of 15 mm.

The counter electrode 31 and the reference electrode 33 are formed with metal lithium. The separator 35 is a polyethylene porous film with a thickness of 40 μm.

In this way, the test cell 30 is composed as a whole.

As an electrolyte of the test cell 30, the above electrolyte is used.

On the test cell 30 prepared, evaluation of initial discharge capacity characteristics and cycle characteristics thereof was carried out by the following procedure.

A charging condition for measurement was as follows: charging under constant current and constant voltage with a voltage value of 5 mV, a current value of 1 mA (initial) and 30 μA (final) and a downtime of 10 minutes. In addition, discharging condition was set as a current value of 1 mA, and a cut voltage of 1.5 V.

As the initial discharge capacity characteristics, a discharge capacity per unit weight of natural graphite, which is the negative electrode active material, was calculated and used after carrying out one cycle of charge-discharge under the above condition.

In addition, as the cycle characteristics, by repeating the charge-discharge under the above condition by 100 cycles, a ratio of a discharge capacity at a 100th cycle to a discharge capacity at a first cycle (initial discharge capacity) (discharge capacity at 100th cycle/discharge capacity at first cycle) was calculated and used as a discharge capacity retaining ratio.

The results are shown in Table 1.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Com. Ex. 1 | Com. Ex. 2 | Com. Ex. 3 | Com. Ex. 4 |
|---|---|---|---|---|---|---|---|---|---|---|---|---|---|---|
| EC + EMC + VC (wt. %) | 90 | 90 | 90 | 90 | 90 | 95 | — | — | — | — | 100 | 90 | 100 | 90 |
| EC + DMC + VC (wt. %) | — | — | — | — | — | — | 90 | 90 | 90 | 90 | — | — | — | — |
| FEC (wt. %) | 10 | 10 | 10 | 10 | 10 | 5 | 10 | 10 | 10 | 10 | — | 10 | — | 10 |
| TMP (wt. %) | 5 | 10 | 15 | 5 | 5 | 10 | 3 | 5 | 5 | 5 | — | — | 10 | 20 |
| TFEP (wt. %) | — | — | — | 5 | 3 | — | — | — | 3 | 3 | — | — | — | — |
| LiPF6 (mol/l) | 1 | 1 | 1 | 1 | 1 | 1 | 1 | 1 | 1 | — | 1 | 1 | 1 | 1 |
| LiBF4 (mol/l) | — | — | — | — | — | — | — | — | — | 1 | — | — | — | — |
| Firing test evaluation * | A | A | A | A | A | A | A | A | A | A | B | B | A | A |
| Initial discharge capacity (Ah/kg) | 324 | 321 | 337 | 326 | 347 | 344 | 349 | 348 | 349 | 325 | 301 | 321 | 308 | 316 |
| Capacity retaining ratio (%, 100 cycles) | 91 | 90 | 89 | 93 | 94 | 92 | 91 | 89 | 90 | 89 | 92 | 89 | 89 | 87 |

A: Flame retardant,
B: Flammable,
Ex.: Example,
Com.: Comparative

EXAMPLE 2

An electrolyte was prepared similarly as in Example 1, except that the electrolyte was prepared by adding trimethyl phosphate (TMP) so as to be 10% by weight, to carry out the firing test and the charge-discharge test.

The results are shown in Table 1.

EXAMPLE 3

An electrolyte was prepared similarly as in Example 1, except that the electrolyte was prepared by adding trimethyl phosphate (TMP) and tris(2,2,2-trifluoroethyl) phosphate (TFEP), so as to attain each 5% by weight, to carry out the firing test and the charge-discharge test.

The results are shown in Table 1.

EXAMPLE 4

An electrolyte was prepared similarly as in Example 1, except that the electrolyte was prepared by adding trimethyl phosphate (TMP) and tris(2,2,2-trifluoroethyl) phosphate (TFEP), so as to attain each 5% by weight, to carry out the firing test and the charge-discharge test.

The results are shown in Table 1.

EXAMPLES 5 TO 10

An electrolyte was prepared similarly as in Example 1, except that the electrolyte was prepared as shown in Table 1, to carry out the firing test and the charge-discharge test.

The results are shown in Table 1.

COMPARATIVE EXAMPLE 1

An electrolyte was prepared similarly as in Example 1, except that a solution, where 0.8% by weight of vinylene carbonate (VC) and 1 mol/l of $LiPF_6$ were dissolved into a mixed solution of ethylene carbonate (EC) and ethyl methyl carbonate (EMC) (volume ratio=1:2), was used as the electrolyte, to carry out the firing test and the charge-discharge test.

The results are shown in Table 1.

COMPARATIVE EXAMPLE 2

An electrolyte was prepared similarly as in Example 1, except that trimethyl phosphate (TMP) was not added, to carry out the firing test and the charge-discharge test.

The results are shown in Table 1.

COMPARATIVE EXAMPLE 3

An electrolyte was prepared similarly as in Example 1, except that the electrolyte was prepared by adding trimethyl phosphate (TMP), so as to attain each 10% by weight, to carry out the firing test and the charge-discharge test.

The results are shown in Table 1.

COMPARATIVE EXAMPLE 4

An electrolyte was prepared similarly as in Example 1, except that the electrolyte was prepared by adding trimethyl phosphate (TMP), so as to attain each 20% by weight, to carry out the firing test and the charge-discharge test.

The results are shown in Table 1.

As is clear from Table 1, the electrolytes of the above Examples have the flame retardancy, as well as high initial discharge capacities and the capacity retaining ratio of 90% or higher after the cycle test, and is superior in durability.

On the other hand, in the above Comparative Examples, those having all of the flame retardancy, the initial discharge capacity and the capacity retaining ratio after the cycle test were not found. In addition, in the case of adding 20% by weight of trimethyl phosphate, a decrease in the initial discharge capacity was observed.

EXAMPLE 11

Evaluation of the lithium secondary battery with a 18650-type (18 mm diameter×65 mm height) battery using the electrolyte and the negative electrode of Example 1 was carried out.

Figure 2:
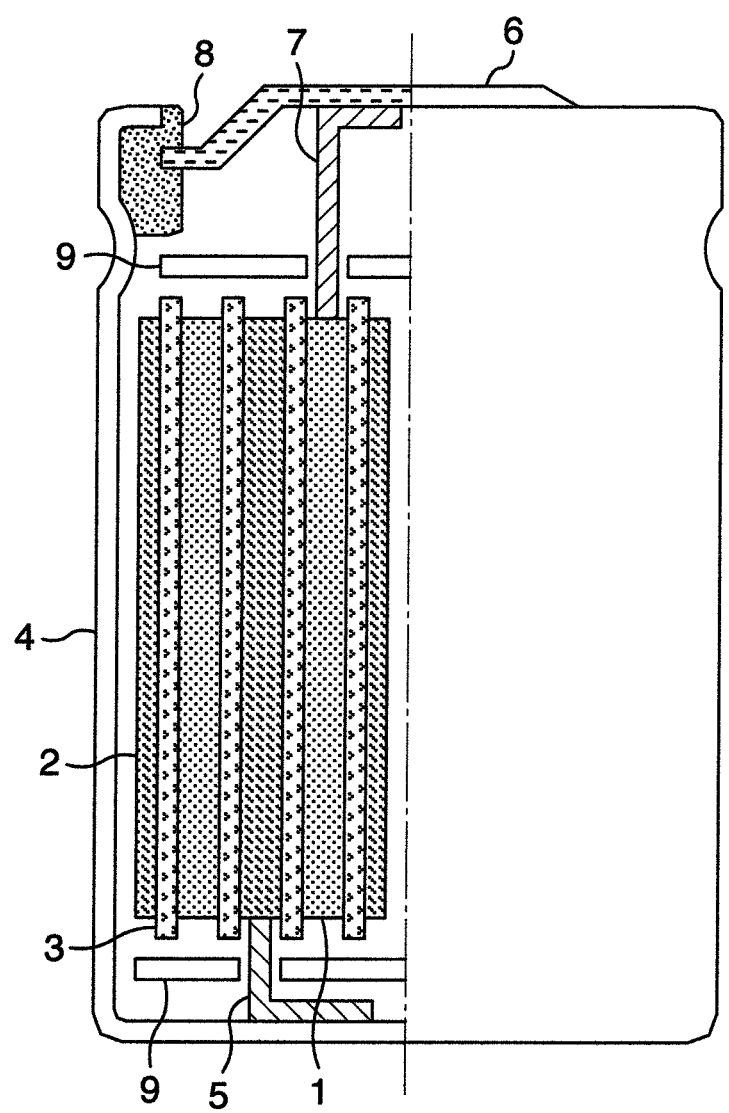
FIG. 2 is a fragmentary sectional view illustrating a lithium secondary battery of an Example.

FIG. 2 is a fragmentary sectional view illustrating a lithium secondary battery.

A positive electrode 1 and a negative electrode 2 are wound cylindrically in a sandwiched state of a separator 3 so as not to contact directly, to form an electrode group. A positive electrode lead 7 is attached to the positive electrode 1, and a negative electrode lead 5 is attached to the negative electrode 2

The electrode group is inserted into a battery can 4. At the bottom part and the upper part of the battery can 4, an insulating plate 9 is installed, so that the electrode group does not directly contact with the battery can 4. The electrolyte is charged in the inside of the battery can 4.

The battery can 4 is sealed in an insulated state from a lid part 6 via a packing 8.

In the present Example, the positive electrode was prepared by the following method.

Firstly, $LiMn_2O_4$, which is a positive electrode active material, and graphite, which is the electric conducting material, were mixed, and further, the binding agent (solution where polyvinylidene fluoride is dissolved in N-methyl-2-pyrrolidone) was added and mixed to prepare the positive electrode mixture slurry. In this case, it was prepared so as to attain for the positive electrode active material to be 88.5% by weight, the electric conducting material to be 4.5% by weight, and the binding agent to be 7% by weight.

After this positive electrode mixture slurry was coated on one surface (front surface) of an aluminum foil which is the collector, it was dried at 100° C. By a similar method, the other surface (rear surface) of the aluminum foil was coated and dried as well.

Then, after compression molding with a roll press machine, and then cutting into a predetermined size, a lead strip made of the aluminum foil for taking out electric current was welded to obtain the positive electrode.

This positive electrode and the negative electrode prepared by the method of Example 1 were wound cylindrically in a sandwiched state of a separator so as not to contact directly, which was then inserted into the 18650-type battery can.

After a collector tab and the lid part of the battery can were connected, the lid part of the battery can and the battery can were welded by laser welding to seal the battery.

Lastly, by pouring the non-aqueous electrolyte from a liquid charging port installed at the battery can, the 18650-type battery (lithium secondary battery) was obtained.

Evaluation of the cycle characteristics of the lithium secondary battery prepared was carried out by the following procedure.

Firstly, the lithium secondary battery was put in a thermostatic chamber at 25° C. and held for 1 hour.

As the initial stage, charging was conducted as follows: charging under constant current and constant voltage up to 4.2 V with a current of 0.3 A, and then discharging was conducted down to 2.7 V with a current of 0.3 A. After that, there were repeated three cycles of charging under constant current and constant voltage up to 4.2 V with a current of 1 A, and discharging down to 2.7 V with a current of 1 A. A discharge capacity at a third cycle was adopted as the initial discharge capacity.

After that, as the cycle characteristics, the lithium secondary battery was put in a thermostatic chamber held at 45° C. By repeating 100 cycles of charging and discharging, where the charging at constant current and constant voltage was carried out under charging conditions of a current value of 0.5 A and the upper limit voltage value of 4.2 V, and the discharging at constant current was carried out under discharging conditions of a current value of 0.5 A and the lower limit voltage value of 3.0 V, a ratio of a discharge capacity at a 100th cycle to a discharge capacity at a first cycle (discharge capacity at 100th cycle/discharge capacity at first cycle) was calculated as a discharge capacity retaining ratio.

As a result, the discharge capacity retaining ratio after 100 cycles was obtained to be 73%.

EXAMPLE 12

The cycle test was carried out similarly as in Example 11, except that the electrolyte of Example 2 was used. As a result, discharge capacity retaining ratio after 100 cycles was obtained to be 66%.

EXAMPLE 13

The cycle test was carried out similarly as in Example 11, except that the electrolyte of Example 4 was used. As a result, the discharge capacity retaining ratio after 100 cycles was obtained to be 72%.

As explained above, it was demonstrated that, according to the present invention, the flame retardancy and the high charge-discharge cycle characteristics of the non-aqueous electrolyte are satisfied at the same time in the lithium secondary battery.

The non-aqueous electrolyte relevant to the present invention and the lithium secondary battery using the same contribute to the performance enhancement of the power source for power storage, the electric car, or the like.

Explanation will be given below on features of the solvent, additives and the like used in the above Examples.

The ethylene carbonate (EC) is a fundamental solvent.

Ethyl methyl carbonate (EMC) is one to be used as a solvent, which can increase its viscosity as compared with the dimethyl carbonate (DMC).

From comparison between Example 5 and Example 8 in Table 1, it is understood that the case where EMC was added has a tendency to provide a high capacity retaining ratio, as compared with the case where DMC was added.

Vinylene carbonate (VC) and fluoroethylene carbonate (FEC) are components contributing to the performance enhancement of the battery.

Because trimethyl phosphate (TMP) and tris(2,2,2-trifluoroethyl) phosphate (TFEP) are components which tend to decrease the battery performance although has the high flame retardancy, it is desirable to add in a small quantity.

From comparison among Example 1 to Example 3 in Table 1, it is understood that the case where TMP was added in a small quantity (5% by weight) has a tendency to provide a high capacity retaining ratio.

In comparing Example 4 and Example 5, with Examples 1 to 3, 6 and 7, in Table 1, it is understood that the case where TFEP was added has a tendency to provide a high capacity retaining ratio. It is also understood that the additive amount of the TFEP is desirable in a small quantity (3% by weight).

From comparison between Example 8 and Example 9 in Table 1, it is understood that, as the supporting electrolyte used in the electrolyte, $LiPF_6$ is desirable as compared with $LiBF_4$.

From the above comparison, Example 4 and Example 5 are desirable in view of the capacity retaining ratio, and in particular, Example 5 is desirable in view of the initial discharge capacity and the capacity retaining ratio.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A non-aqueous electrolyte, comprising a chain carbonate, vinylene carbonate, a fluorinated cyclic carbonate, a phosphate ester, ethylene carbonate and a supporting electrolyte;
   wherein the phosphate ester comprises trimethyl phosphate and a fluorinated phosphate ester; the chain carbonate is ethyl methyl carbonate or dimethyl carbonate; the supporting electrolyte is $LiPF_6$; the fluorinated cyclic carbonate is fluoroethylene carbonate;
   wherein an additive amount of the phosphate ester is 1 to 15% by weight and an additive amount of the fluorinated phosphate ester is 0.5 to 6% by weight; and
   wherein the fluorinated phosphate ester is tris(2,2,2-trifluoroethyl) phosphate.

2. The non-aqueous electrolyte according to claim 1, further comprising at least one kind of salt selected from a group consisting of bis(oxalato)borate, difluoro(oxalato)borate, tris(oxalato)phosphate, difluoro(bisoxalato)phosphate, and tetrafluoro(bisoxalato)phosphate.

3. The non-aqueous electrolyte according to claim 2, wherein an additive amount of the phosphate ester is 1 to 9% by weight and an additive amount of the fluorinated phosphate ester is 0.5 to 4% by weight.

4. The non-aqueous electrolyte according to claim 3, wherein a total amount of the ethylene carbonate, the ethyl methyl carbonate or dimethyl carbonate, and the vinylene carbonate is equal or greater than 90% by weight.

5. A lithium secondary battery comprising:
   a battery can and a lid configured to seal the battery can;
   an electrode group disposed inside the battery can, the electrode group comprising a positive electrode, a negative electrode, and a separator disposed between the positive electrode and the negative electrode, a positive electrode lead connected to the positive electrode and the lid, and a negative electrode lead connect to the negative electrode and the battery can; and
   the non-aqueous electrolyte according to claim 1 charged inside the battery can.

* * * * *